US005652401A

United States Patent [19]

Nakamura

[11] Patent Number: 5,652,401

[45] Date of Patent: Jul. 29, 1997

[54] RECORDING MEDIA, REPRODUCING APPARATUS AND METHOD FOR KARAOKE USE INCLUDING MEANS FOR ADDING A HARMONIZING SIGNAL TO A SINGER'S VOICE

[75] Inventor: Junichi Nakamura, Chiba, Japan

[73] Assignee: Sony Corporation, Tokyo, Japan

[21] Appl. No.: 412,528

[22] Filed: Mar. 29, 1995

[30] Foreign Application Priority Data

Apr. 6, 1994 [JP] Japan .................................... 6-093141

[51] Int. Cl.$^6$ .............................. G10H 7/00; H02M 5/00

[52] U.S. Cl. ................................................ 84/619; 84/613

[58] Field of Search .............................. 84/609, 613, 619, 84/634, 637, 657, 666, 669

[56] References Cited

U.S. PATENT DOCUMENTS

| | | | |
|---|---|---|---|
| 4,771,671 | 9/1988 | Hoff, Jr. . | |
| 5,157,215 | 10/1992 | Nakae et al. | 84/624 |
| 5,159,141 | 10/1992 | Iba | 84/619 |
| 5,278,346 | 1/1994 | Yamaguchi | 84/609 |
| 5,286,912 | 2/1994 | Yamaguchi | 84/616 |
| 5,296,643 | 3/1994 | Kuo et al. | 84/610 |
| 5,313,011 | 5/1994 | Koguchi | 84/609 |
| 5,446,238 | 8/1995 | Koyama et al. | 84/669 |
| 5,477,003 | 12/1995 | Muraki et al. . | |

*Primary Examiner*—Jonathan Wysocki
*Assistant Examiner*—Jeffrey W. Donels
*Attorney, Agent, or Firm*—Limbach & Limbach L.L.P.; Philip M. Shaw, Jr.

[57] ABSTRACT

A reproducing apparatus for a recording medium recorded with compressed image data, audio data relating to musical accompaniment, character data relating to musical accompaniment, data showing the musical accompaniment scale, scale data for a scale change position and a position after a scale change and data showing a time passage relating to an audio signal relating to the musical accompaniment has an image reproducing unit, a reproducing unit, a signal generating unit and a mixer. The image reproducing unit decodes and reproduces image data read-out from the recording medium. The reproducing unit reproduces audio signals relating to musical accompaniment, character data and data displaying a scale from the recording medium. The signal generating unit generates a harmony signal for the audio signal outputted from the microphone based on data displaying the scale played back by the playback part. The mixer mixes and outputs the audio signal outputted from the microphone, the audio signal reproduced by the reproducing unit and the harmony signal from the signal generating unit.

14 Claims, 6 Drawing Sheets

FIG.3

| | item number | contents |
|---|---|---|
| - | 0~ 7 | (disk item) |
| required | 8 | song ISRC code |
| required | 9 | song title |
| optical | 10 | song title (for changing line-up) |
| required | 11 | performers name |
| optical | 12 | performers name (for changing line-up) |
| required | 13 | songwriters name |
| required | 14 | composers name |
| optical | 15 | arrangers name |
| optical | 16 | original performers name |
| optical | 17 | lyrics header |
| optical | 18 | lyrics |
| optical | 19 | karaoke scale (step) |
| optical | 20 | original song scale |
| optical | 21 | details of song contents |
| optical | 22~31 | maker proposal clause |
| optical | 32~64 | reserve area |

SITi sequence item table

FIG. 6A

| EDS | Musical scale (pitch) |
|---|---|
| 20H | Major scale |
| 21H | Minor scale |
| 22H | Dorian scale |
| 23H | Lydian scale |
| 24H | Mix-Lydian scale |
| 25H | Phrygian scale |
| 26H | Locrian scale |

FIG. 6B

| EDK | Musical scale |
|---|---|
| 30H | C |
| 31H | D♭ |
| 32H | D |
| 33H | E♭ |
| 34H | E |
| 35H | F |
| 36H | G♭ |
| 37H | G |
| 38H | A♭ |
| 39H | A |
| 3AH | B♭ |
| 3BH | B |

RECORDING MEDIA, REPRODUCING APPARATUS AND METHOD FOR KARAOKE USE INCLUDING MEANS FOR ADDING A HARMONIZING SIGNAL TO A SINGER'S VOICE

BACKGROUND

1. Field of the Invention

The present invention relates to a reproducing apparatus for a medium, a reproducing apparatus for a recording medium and a medium for karaoke use. More particularly, the present invention relates to a medium having data showing a musical accompaniment scale or a reproducing apparatus for a recording medium having data showing a musical accompaniment scale and a medium for karaoke use having data showing a musical accompaniment scale.

2. Background of the Invention

With karaoke apparatus, additional reverberation processing or frequency characteristic compensation is carried out on the singers voice i.e. the audio signal of the singers' voice, in order to enhance the results of the singer's singing.

This processing and correction is widely used as good results can be obtained regardless of the song or lyrics etc. which are sung.

However, as echo processing and frequency characteristic correction are widely used and common, marked effects cannot be obtained.

SUMMARY OF THE INVENTION

It is therefore an object of the present invention to provide a reproducing apparatus for a medium which resolves the above-mentioned problem.

It is a further object of the present invention to provide a medium for karaoke use which resolves the aforementioned problem.

According to the present invention, there is provided a reproducing apparatus for a medium. The medium has an audio signal related to musical accompaniment and data showing a scale of the musical accompaniment. The apparatus includes a reproducing unit, a signal generating unit and a mixer. The reproducing unit reproduces from the medium an audio signal relating to the musical accompaniment and data representing a scale. The signal generating unit generates a harmony signal for an audio signal outputted from a microphone based on data representing a scale reproduced by the reproduced unit. The mixer mixes and outputs the audio signal outputted from the microphone, an audio signal reproduced by the reproducing unit and the harmony signal from the signal generating unit.

According to the present invention, there is provided a reproducing apparatus for a medium. The medium has an audio signal relating to musical accompaniment, character data relating to the musical accompaniment, data representing a scale of the musical accompaniment and a key change position and scale data for after a key change. The apparatus has a reproducing unit, a signal generating unit and a mixer. The reproducing unit reproduces from the medium an audio signal relating to the musical accompaniment, character data, scale-displaying data and scale data for the key-change position and the position after key-changing. The signal generating unit generates a harmony signal for an audio signal outputted from a microphone based on data of a scale being played back by the reproducing unit and controls the scale of the harmony signal being generated based on scale data for the key-change position and the position after key-changing generated by the reproducing unit. The mixer mixes and outputs the audio signal outputted from the microphone, the audio signal reproduced by the reproducing unit and harmony signal from the signal generating unit.

According to the present invention, there is provided a reproducing apparatus for a recording medium. The recording medium has an audio signal relating to musical accompaniment, character data relating to the musical accompaniment, data representing a scale of the musical accompaniment, scale data for a key change position and after a key change and data relating to a time passage relating to the audio signal relating to the musical accompaniment. The apparatus includes a reproducing unit, a signal generating unit and a mixer. The reproducing unit reproduces from the recording medium the audio signal relating to the musical accompaniment, the character data and data representing the scale. The signal generating unit generates a harmony signal becoming a chord for an audio signal outputted from a microphone based on data representing a scale being played back by the reproducing unit. The mixer mixes and outputs the audio signal outputted from the microphone, the audio signal reproduced back by the reproducing unit and the harmony signal from the signal generating unit.

According to the present invention, there is provided a medium for karaoke use recorded with at least one audio signal relating to a musical accompaniment song, scale data showing an audio signal scale relating to the musical accompaniment, character data relating to the musical accompaniment and scale data for a key change position and a position after a key change.

BRIEF DESCRIPTION OF THE DRAWINGS

FIG. 3 is a view showing an example of a data table;

FIGS. 6A and 6B are views showing a data contents example.

DESCRIPTION OF THE INVENTION (First Embodiment)

The following is a detailed description, with reference to the drawings, of a reproducing apparatus for a recording medium for a first embodiment of the present invention. In the example disclosed in the following, a description is given taking as an example a case where the recording medium is a disc-shaped recording medium.

Figure 1:
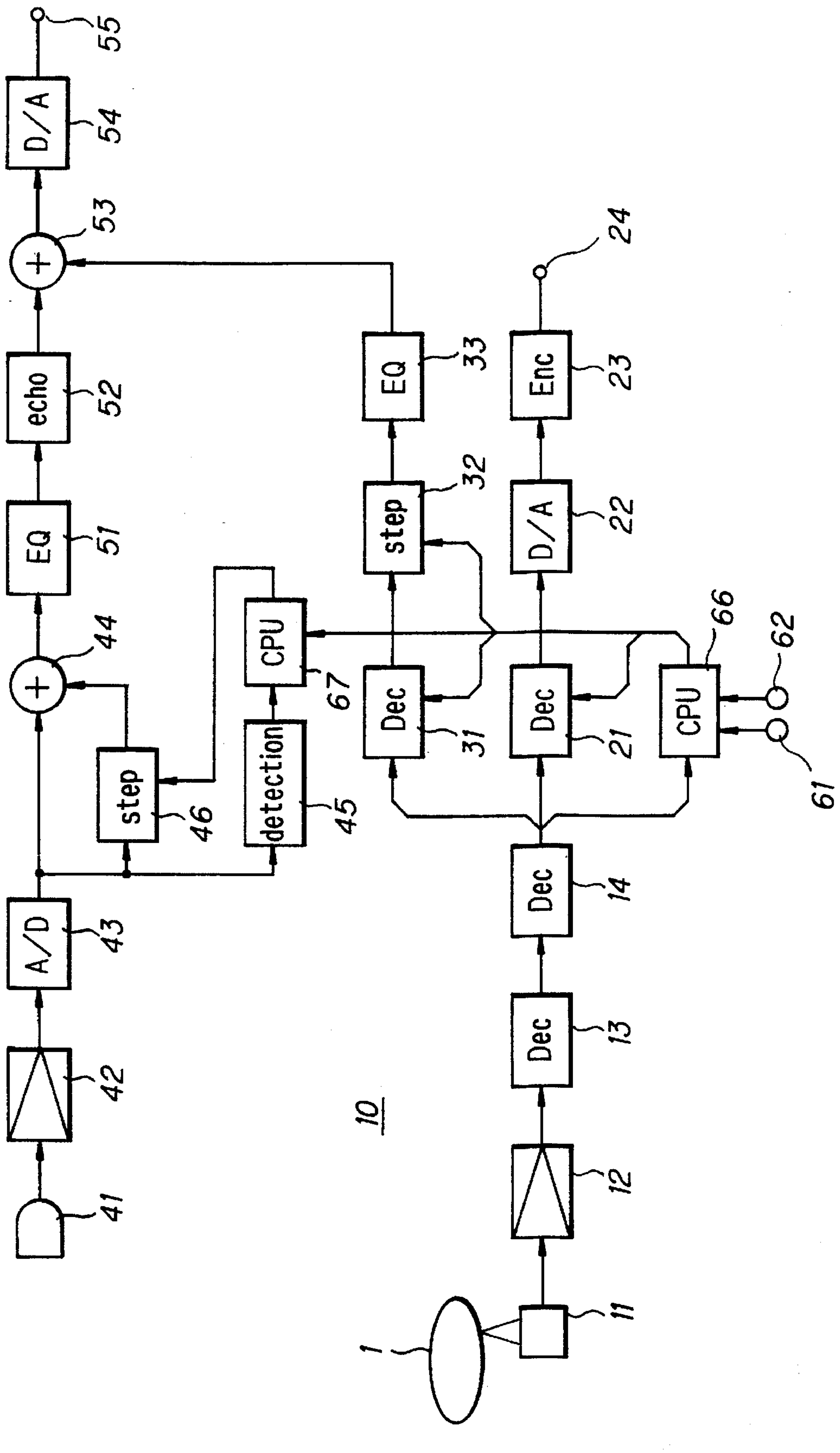
FIG. 1 is a block diagram relating to a disc reproducing apparatus of a first embodiment of the present invention.
Figures 2A, 2B:
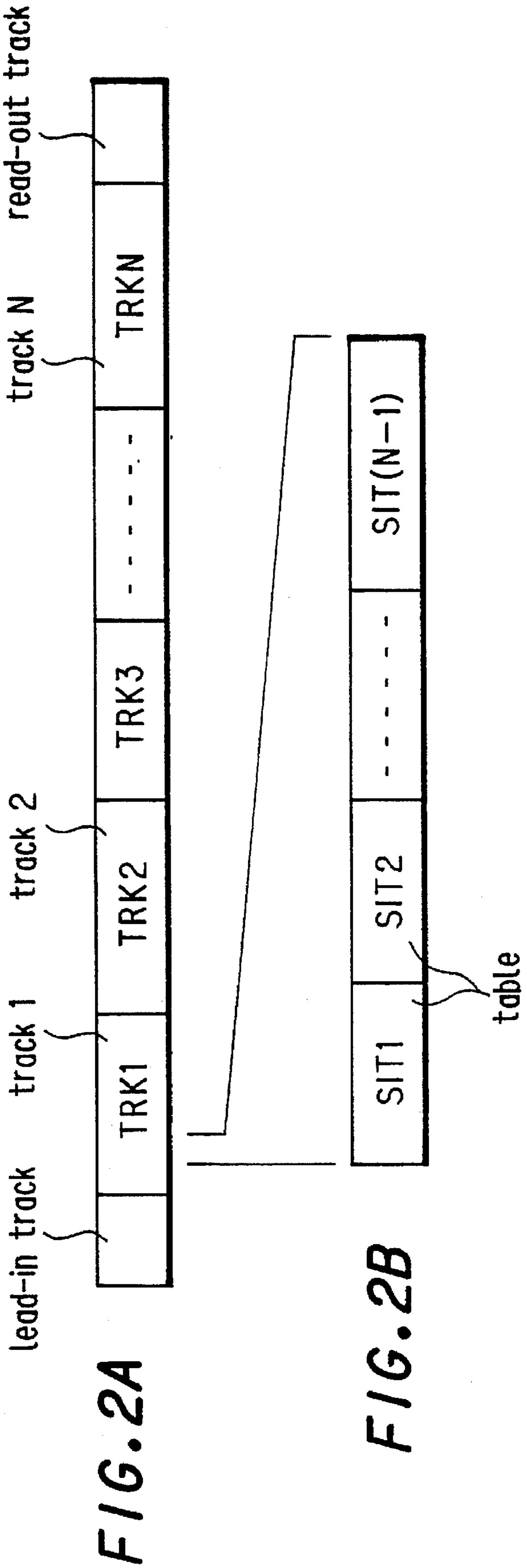
FIGS. 2A and 2B are explanatory diagrams for describing the disc track format of a recording medium used for the present invention.

In FIG. 1, a reference numeral 1 denotes a video CD taken as a disc recording medium for karaoke use and a reference numeral 10 denotes it's reproducing apparatus. The disc 1 is rotatably driven at a constant linear velocity by a rotational driving device not shown in the drawings. As shown in FIG. 2A, the disc 1 has a lead-in track at it's head portion, followed by N ($N \leqq 99$) data tracks TRK1 to TRKN and a lead-out track. Each of the various types of information and data relating to the disc i.e. the video CD contents are recorded on the first track TRK1 of the tracks TRK1 to TRKN. It is also recorded on track TRK1 that the disc 1 is a video CD for Karaoke use.

An (N−1) song Karaoke data table is prepared at this first track TRK1, as shown in FIG. 2B. This table is referred to as the "sequence item table" and is constructed independently for every one song part. That is, (N−1) sequence item tables SIT1 to SIT(N−1) corresponding to each karaoke song are provided.

FIG. 3 shows a structure of an SITi (i=1 to (N−1)) table with 64 clause sections. There are required and optional clauses but the contents of the clause sections can vary in length. For example, clause number 9 is taken as a song title section and it's contents are data displaying the song title as text data. Clause number 18 is taken to be the lyric clause section, with the lyrics being stored in text data form.

Clause number 19 is prepared with data showing the scales (musical intervals) C, C# and Cm. The clause sections 22 to 31 of clause numbers 22 to 31 are left open for the manufacturer or the maker which manufactures recording media for karaoke use.

The data of the video signal and the data of the audio signal of the karaoke for the first program is recorded in data compressed form on a second track TRK2. In this case, the data of the video signal, for example, a luminance signal and two color difference signals are data-compressed using an MPEG (Moving Picture Expert Coding Group) method and then recorded. With the data of the audio signal also, left and right channel signals are put into single blocks on every prescribed number of samples and each of these blocks are then data compressed and recorded.

These video and audio Signals are recorded in sector units but the sequence and number of video signal sectors and audio signal sectors i.e. the relation between the number of audio signal sectors and video signal sectors is not fixed. Because of this, data showing whether the signal recorded in a sector is a video signal or an audio signal is recorded together with other information at the head portion of each sector.

The karaoke video signals and audio signals for the second to (N−1)th songs are recorded in data compressed states on the third to Nth tracks TRK3 to TRKN, respectively.

At the reproducing apparatus 10, a signal recorded on the disc 1 is read out by an optical pick-up 11. The output signal from the optical pickup 11 is then supplied to a playback decoder 13 through a playback amplifier 12, where processes such as EFM demodulation and error correction are carried out. The signal processed by the playback decoder 13 is supplied to a CD-ROM decoder 14 where selector unit decode processing is carried out and each signal is outputted.

The data for the first track TRK1 of the output signals from the decoder 14 is taken up by a system controller 66 constructed from a microcomputer and is hereafter used by the system controller 66 for reproducing control.

The data of the video signal of the output signals from the decoder 14 are inputted to the decoder 21 and decoded into video signals i.e. a luminance signal and two chrominance signals. This decoded video signal is then D/A converted into an analog signal at the D/A converter 22. This D/A converted video signal is supplied to an NTSC encoder 23, encoded into an NTSC color composite video signal and outputted to a terminal 24.

The data of the audio signal of the output signals from the decoder 14 is inputted to an MPEG decoder 31 and decoded into an audio signal, i.e. left and right channel audio signals relating to musical accompaniment for karaoke use. This decoded audio signal is supplied to a musical interval converting circuit 32.

This converting circuit 32 makes it easy to sing by adjusting the musical interval of the provided audio signals into an audio band in which the singer can sing. A musical interval inputting unit 61 (i.e. input to CPU 66) is therefore provided at the reproducing apparatus 10 in order to achieve this. When data designating the musical interval is inputted to the CPU 66 from this inputting unit 61, the inputted data is supplied to the converting circuit 32 through the system controller 66. This means that the musical interval of the audio signal being provided to the converting circuit 32 is transposed to the musical interval designated by the data inputted from the inputting unit 61.

Further, an operator 62 for adjusting song speed is provided at the reproducing apparatus 10. The output of this operator 62 is supplied to the system controller 66. The rotational speed of the disc 1 and the playback speed of the video signal and audio signal controlled by the decoder circuits 21 and 31 are then changed in accordance with the output of the operator 62. Variations in a signal occurring due to changes in this speed are then corrected.

The audio signal from the converting circuit 32 is supplied to a mixer 53 through an equalizer 33. In this case, the equalizer 33, for example, divides the karaoke audio signal into a number of bands and corrects the level for each band.

An audio signal corresponding to the singer's voice is supplied to an A/D converter 43 through an amplifier 42 and is A/D converted. This A/D converted audio signal is supplied to the aforementioned mixer 44 via an equalizer 51 before being supplied to the mixer 53 through an echo processor 52. In this case, the equalizer 51 divides the signal corresponding to the singers voice up into a plurality of bands and corrects the level for each band. The echo processor 52 adds the desired reverberation to the audio signal corresponding to the singer's voice provided.

The audio signal read and reproduced from the disc 1 and the audio signal outputted from the microphone 41 are mixed at the mixer 53 i.e. an audio signal which is the singers voice with karaoke musical accompaniment is obtained. The audio signal outputted from the mixer 53 is supplied to the D/A converter 54, D/A converted, and outputted to the terminal 55.

In the case of this invention, a harmony audio signal is formed from the audio signal outputted from the microphone 41 and this is added to the audio signal inputted through the microphone 41.

Namely, the audio signal from the microphone 41 which is converted to a digital signal by the A/D converter 43 is supplied to a musical interval detection circuit 45 and the musical interval (i.e. pitch) of the audio signal from the microphone 41 is detected. The detection signal which detected this musical interval is then supplied to a musical interval controller 67 composed of a microcomputer. The interval controller 67 generates musical interval data displaying a musical interval related to a chord with respect to a musical interval of an audio signal from a microphone 41 detected by the detection circuit 45.

In this case, according to chord theory, the chord relationship is separated with respect to the musical interval of the audio signal from the microphone 41, i.e. the voice musical interval by ±3 3 notes or ±5 notes (with the first and last notes each being counted), i.e. by ± a musical third or a musical fifth. However, according to experiment, if audio of a musical interval of +3 or +5 notes i.e. harmony is added, the singer's musical interval tends to be drawn-into the musical interval of that which is added. Also, for a −5 note musical interval for which the musical interval of the singer's voice is low, the harmony becomes too low and some of the harmonizing effect is lost.

So, in the embodiments of the present invention, musical interval data showing a musical interval which is three octaves down from the musical interval of the singer's voice detected by the detection circuit 45 is generated at the interval controller 67.

However, at this time, the musical interval difference (frequency ratio) of a musical interval three octaves down from the vocal musical interval differs depending on the scale of the song. For example, in FIG. 4A a C-minor scale is shown but the musical interval 3 octaves lower than Ab is F, with the musical interval difference being 300 cent. However, as shown in FIG. 4B, with a C-major scale the musical interval 3 notes lower than A is F but the musical interval difference here is 400 cent. Also, in the C-minor scale in FIG. 4A, Eb is three notes lower than G, with the musical interval difference being 400 cent.

Further, let specific numeric values be considered. i.e.

fv: frequency of audio signal coming from microphone

Δf: correction value of the frequency due to the converting circuit 32

Now, for example, by making fv=437.4 Hz (=Ab4+2.9%) and

Δf=+50 cent (=+2.9%)

the vocal frequency when Δf=0 is:

$$\begin{aligned} fv - \Delta f &= 427.4\,(\text{Hz}) \times 2(-50/1200) \\ &= 415.3\,(\text{Hz}) \\ &= Ab4 \end{aligned}$$

F is present 3 notes below Ab, and in the case of C-minor, the musical interval difference can be seen to be 300 cent from FIG. 4.

Also, for example, by making fv=403.5 Hz (=G4+2.9%) and

Δf=+50 cent (=+2.9%), the vocal frequency when Δf=0 is:

$$\begin{aligned} fv - \Delta f &= 403.5\,(\text{Hz}) \times 2(-50/1200) \\ &= 392\,(\text{Hz}) \\ &= G4 \end{aligned}$$

Figure 4A:
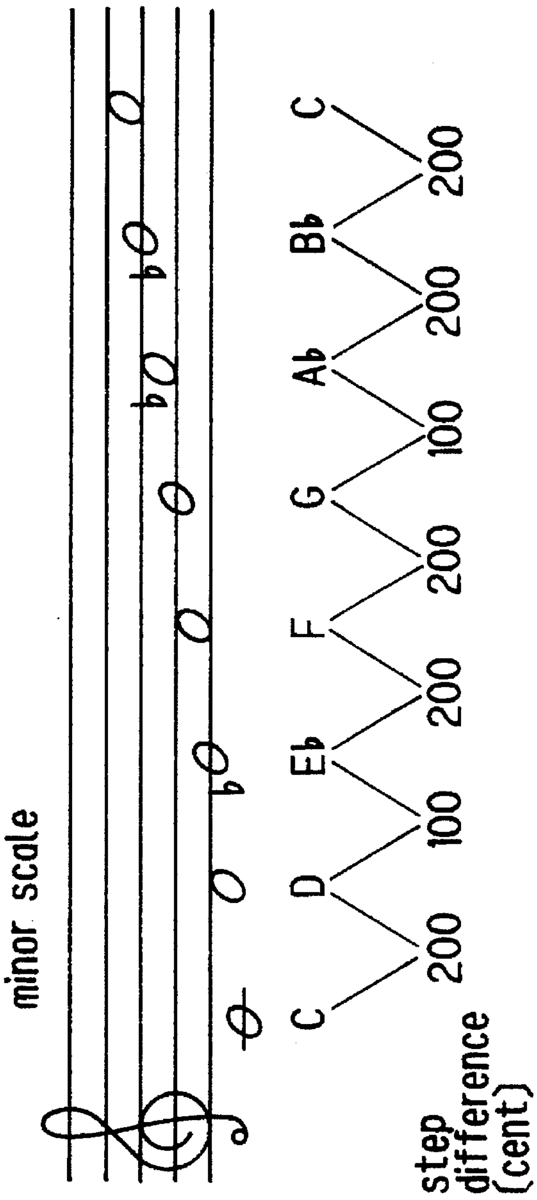
FIGS. 4A and 4B are views for describing a musical interval difference.
Figure 4B:
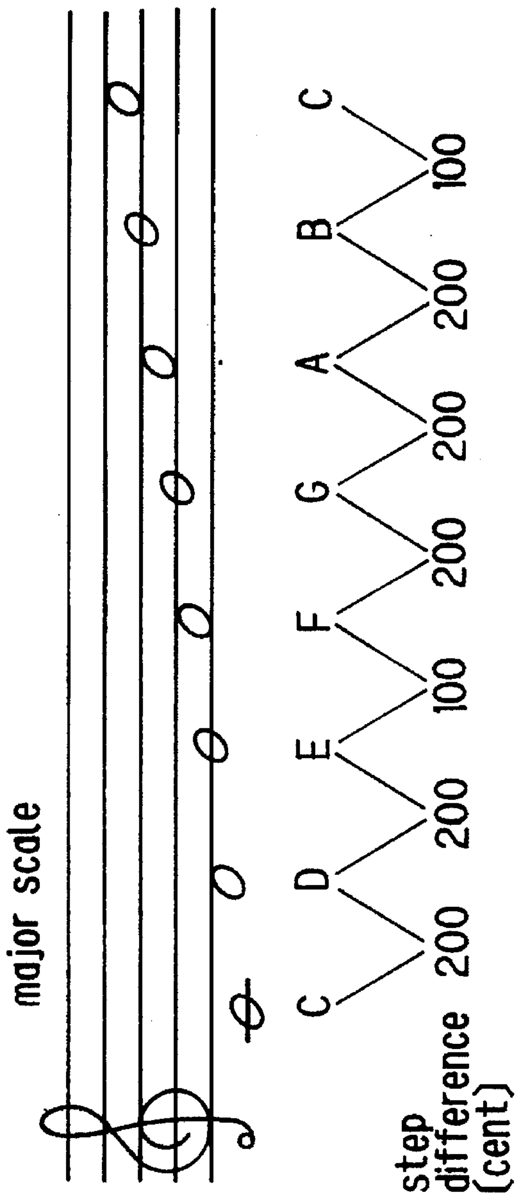

Here, Eb is present 3 notes down from G, and at the time of a C-scale, it becomes clear from FIG. 4A that the musical interval difference is 400 cent.

So, in this embodiment of the present invention, a table showing the musical interval difference for each musical interval for every scale i.e. a musical interval difference table, is provided at the interval controller 67, as shown, for example, in FIGS. 4A and 4B. Also, data showing the scale of the karaoke musical accompaniment recorded in item number 19 is taken out from the data for the table SITi of the data for the first track TRK1 taken up by the system controller 66. This scale data is then supplied to the interval controller 67.

At the interval controller 67, musical interval difference tables for each of the scales of the kind shown in FIGS. 4A and 4B are selected by the scale data recorded at item number 19. Musical interval data is then formed for a musical interval 3 octaves down with respect to the musical interval of the singer's voice using this selected musical interval difference table.

Then, the audio signal from the microphone 41 converted into a digital signal by the A/D converter 43 is supplied to the musical interval transposer 46 and musical interval data is supplied from the interval controller 67 to the musical interval transposer 46. The audio signal from the microphone 41 is transposed to an audio signal for the musical interval transposer 46 for which the musical interval is 3 octaves down, i.e. transposed to a harmony audio signal. This harmony audio signal is supplied to the mixer 44 and is mixed with the original audio signal i.e. the audio signal for the singer's voice.

An audio signal is therefore outputted from the mixer 44 which is the audio signal from the microphone 41 with harmonies added. An audio signal relating to the singer's voice with harmonies added with the karaoke musical accompaniment reproduced from the disc 1 as background is then outputted from the terminal 55.

According to the disc 1 and reproducing apparatus shown in FIG. 1, karaoke can be enjoyed. However, in this case, and in particular according to the aforementioned disc 1 and reproducing apparatus 10, harmonies can be automatically added to the singer's vocals. As a result of this, during a song, and particularly in portions where the atmosphere comes to a climax and it is desired to sing, i.e. at a crescendo portion, harmonies can be added in an extremely effective manner. Harmonies can also be added in a manner which is in line with musical theory by using scale data included in the table SITi.

Also, in cases where harmonies are added to the vocals by preparedly mixing and recording a harmonizing audio signal with an audio signal relating to karaoke musical accompaniment, the harmony is constant. According to the present invention, by attaching harmonies in accordance with a singer's vocals in such a manner that, for example, the harmonies disappear if the vocals disappear and the harmonies go out of time if the singers voice goes out of time, a very effective karaoke apparatus for public use can be obtained.

Also, a key-change may occur midway, depending on the song. In doing so, the musical interval difference table is selected in accordance with the data for the scale recorded in item 19 of the table SITi, so the harmony structure will fall apart for this key-changed portion and become rather unpleasant.

(Second Embodiment)

As a result of this, the case described in the following for the second embodiment of this invention also corresponds with key changes in the middle of a song. The following description of the second embodiment describes portions which are distinct from the first embodiment. Other portions are constructed in the same way as for the first embodiment. In this second embodiment, the contents of, for example, item number 22 of item numbers 22 to 31 of the table SITi are made to be data showing a time position for the key change and the scale after the key change.

Figure 5:
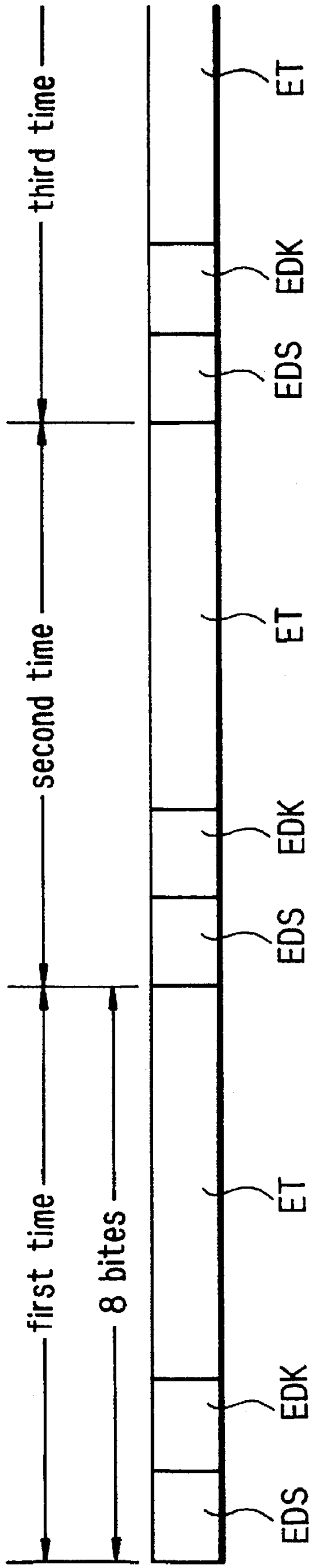
FIG. 5 is a view showing an example of a data format of a disc taken as a recording medium for a second embodiment of the present invention.

As shown in FIG. 5, an eight-byte area for a one-time key change is allotted to item number 22 of the table SITi. The first and second bytes of these bytes are, for example, for the data EDS and EDK showing the scale after a key change, as shown in FIGS. 6A and 6B. For example, when EDS=20 H (H denotes hexadecimal form), it is shown that the scale after key change is major, and when EDS=21, a minor scale is shown. Also, when EDK=30 H, it is shown that the scale after key change is C and when EDK=31 H, Db is shown.

Further, the third byte to the eighth byte are taken for data ET for displaying the minutes, seconds and frame of the time of the key change. This minute, second and frame are written into an absolute address showing a reproducing position on the disc 1 i.e. written into the leading header portion of each sector of the disc 1. This key-change position is designated using absolute time data displaying the passage of time from the leading portion of this song.

When a key change is carried out three or more times, the aforementioned eight bytes of data EDS to ET are taken to be one group and the data contents corresponding to each key change are repeated.

This data EDS to ET is read out from the disc 1 when the disc 1 is installed in the reproducing apparatus 10 and is stored by the system controller 66. While the song is being reproduced, the key change time data ET from the data EDS to ET stored at the system controller 66 and the absolute time data played back from each sector of the disc 1 in real time are compared. When the absolute time position data ET and the absolute time data from the disc 1 both coincide, the scale data EDS and EDK for after the key change which has become a group with the key-change time position data ET which has coincided is transmitted to the interval controller 67.

The musical interval difference table for the interval controller 67 is selected using the transmitted scale data EDS and EDK. Musical interval data is then generated designating a musical interval which is 3 notes down from the musical interval of the singers vocals using this selected musical interval difference table. This musical interval data is supplied to the musical interval transposer 46 and a harmony signal of a musical interval which is three notes down from the musical interval of the vocal audio signal after the key change is generated.

Therefore, harmonizing of the correct chord structure can be achieved even if the key changes midway through a song.

In the above, processing such as correcting frequency characteristics and echo processing can be carried out independently for the harmony audio signal. Also, rather than just being used for key changes, the data EDS and EDK can also be used for allowing and prohibiting the forming of a harmony audio signal. In this case, harmonies may be assigned only to a specific part of a singers vocals.

In the above, a description has been given of the present invention applied to a disc such as a karaoke format video CD disc taken as a recording medium and it's reproducing apparatus. However, the present invention may also be applicable to, for example, a usual music CD, an optical video disc or a karaoke system using communication network, as long as there is an audio signal for karaoke musical accompaniment and a medium having data displaying the karaoke scale.

What is claimed is:

1. A reproducing apparatus for a medium, the medium having an audio signal related to musical accompaniment and data representing a scale of the musical accompaniment, said apparatus comprising:

reproducing means for reproducing from the medium an audio signal relating to the musical accompaniment and data representing a scale;

signal generating means, including a detector for detecting the musical interval of an audio signal outputted from the microphone, for generating a harmony signal a musical third below the detected musical interval of the audio signal outputted from the microphone and based on data representing a scale being reproduced by said reproducing means; and mixing means for mixing and outputting the audio signal outputted from the microphone, the audio signal reproduced by said reproducing means and the harmony signal from the signal generating means.

2. A reproducing apparatus for a medium, the medium having an audio signal related to musical accompaniment and data representing a scale of the musical accompaniment, said apparatus comprising:

reproducing means for reproducing from the medium an audio signal relating to the musical accompaniment and data representing a scale;

signal generating means for generating a harmony signal for an audio signal outputted from a microphone based on data representing a scale being reproduced by said reproducing means, wherein said signal generating means comprises a musical interval difference table having data representing a musical interval difference of each musical interval of every scale, and selects musical interval difference table musical interval difference data based on data representing the scale being played back by said reproducing means so as to generate the harmony signal with respect to the audio signal outputted from the microphone using selected musical interval difference data; and mixing means for mixing and outputting the audio signal outputted from the microphone, the audio signal reproduced by said reproducing means and the harmony signal from the signal generating means.

3. A reproducing apparatus for a medium according to claim 2, wherein said signal generating means further comprises a musical interval transposing means, said signal generating means generates musical interval data based on the selected musical interval difference data, and said musical interval transposing means transposes the audio signal outputted from the microphone to the harmony signal based on generated musical interval data.

4. A reproducing apparatus for a medium according to claim 2, wherein the signal generating means further comprises a detector for detecting the musical interval of the audio signal outputted from the microphone and generates the harmony signal a musical third below the detected musical interval of the audio signal outputted from the microphone.

5. A reproducing apparatus for a medium, the medium being recorded with an audio signal relating to musical accompaniment, character data relating to the musical accompaniment, data representing a scale of the musical accompaniment and a key change position and scale data for after a key-change, said apparatus comprising:

reproducing means for playing back from the medium an audio signal relating to the musical accompaniment, character data, scale-displaying data and scale data for the key-change position and the position after key-changing;

signal generating means for generating a harmony signal for an audio signal outputted from a microphone based on data representing a scale being played back by said reproducing means and controlling the scale of the harmony signal being generated based on scale data for the key-change position and the position after key-changing generated by said reproducing means; and mixing means for mixing and outputting the audio signal outputted from the microphone, the audio signal reproduced by said reproducing means and the harmony signal from said signal generating means.

6. A reproducing apparatus for a medium according to claim 5, wherein said signal generating means comprises a musical interval difference table having data representing a musical interval difference of each musical interval of every scale, wherein said signal generating means selects musical interval difference table musical interval difference data based on data representing the scale being reproduced by said reproducing means, the audio signal outputted from the microphone is transposed to the harmony signal using selected musical interval difference data, and the harmony signal is a key-changed harmony signal based on scale data reproduced by said reproducing means after key-changing.

7. A reproducing apparatus for a medium according to claim 6, wherein said signal generating means further comprises a musical interval transposing means, said signal generating means generates musical interval data based on the selected musical interval difference data, and said musical interval changing means transposes the audio signal outputted from the microphone based on the generated musical interval data to a harmony signal key-changed based on scale data reproduced by said reproducing means after a key change.

8. A reproducing apparatus for a recording medium, the recording medium being recorded with an audio signal relating to musical accompaniment, character data relating to the musical accompaniment, data representing a scale of the musical accompaniment, a key change position and scale data for after a key-change and data relating to a time passage relating to the audio signal relating to the musical accompaniment, said apparatus comprising:

reproducing means for reproducing from the recording medium the audio signal relating to the musical accompaniment, the character data and data representing the scale;

signal generating means, including a detector for detecting the musical interval of an audio signal outputted from the microphone, for generating a harmony signal a musical third below the detected musical interval of the audio signal outputted from the microphone and based on dam representing a scale being reproduced by said reproducing means; and mixing means for mixing and outputting the audio signal outputted from the microphone, the audio signal reproduced by said reproducing means and the harmony signal from said signal generating means.

9. A reproducing apparatus for a recording medium, the recording medium being recorded with an audio signal relating to musical accompaniment, character data relating to the musical accompaniment, data representing a scale of the musical accompaniment, a key change position and scale data for after a key-change and data relating to a time passage relating to the audio signal relating to the musical accompaniment, said apparatus comprising:

reproducing means for reproducing from the recording medium the audio signal relating to the musical accompaniment, the character data and data representing the scale;

signal generating means for generating a harmony signal for an audio signal outputted from a microphone based on data representing a scale being reproduced by said reproducing means;

mixing means for mixing and outputting the audio signal outputted from the microphone, the audio signal reproduced by said reproducing means and the harmony signal from said signal generating means; and control means for detecting data representing the time passage relating to the audio signal relating to the musical accompaniment recorded on the recording medium, controlling said signal generating means based on data representing a key change position reproduced by said reproducing means, and changing the key of the harmony signal based on scale data reproduced by said reproducing means after a key change.

10. A reproducing apparatus for a recording medium according to claim 9, wherein said signal generating means further comprises a musical interval transposing means and generates musical interval data based on the selected musical interval difference data, and said musical interval transposing means transposes the audio signal outputted from the microphone to the harmony signal based on generated musical interval data.

11. A reproducing apparatus for a recording medium, the recording medium being recorded with an audio signal relating to musical accompaniment, character data relating to the musical accompaniment, data representing a scale of the musical accompaniment, a key change position and scale data for after a key-change and data relating to a time passage relating to the audio signal relating to the musical accompaniment, said apparatus comprising:

reproducing means for reproducing from the recording medium the audio signal relating to the musical accompaniment, the character data and data representing the scale;

signal generating means for generating a harmony signal for an audio signal outputted from a microphone based on data representing a scale being reproduced by said reproducing means, wherein said signal generating means comprises a musical interval difference table having data representing a musical interval difference of each musical interval of every scale, the signal generating means selects musical interval difference table data based on data representing the scale being reproduced by said reproducing means, and the harmony signal is generated for the audio signal outputted from the microphone using selected musical interval difference data; and mixing means for mixing and outputting the audio signal outputted from the microphone, the audio signal reproduced by said reproducing means and the harmony signal from said signal generating means.

12. A reproducing apparatus for a medium according to claim 11, wherein the signal generating means further comprises a detector for detecting the musical interval of the audio signal outputted from the microphone and generates the harmony signal a musical third below the detected musical interval of the audio signal outputted from the microphone.

13. A reproducing apparatus for a recording medium, the recording medium being recorded with an audio signal relating to musical accompaniment, character data relating to the musical accompaniment, data representing a scale of the musical accompaniment, a key change position and scale data for after a key-change and data relating to a time passage relating to the audio signal relating to the musical accompaniment, said apparatus comprising:

reproducing means for reproducing from the recording medium the audio signal relating to the musical accompaniment, the character data and data representing the scale;

signal generating means for generating a harmony signal for an audio signal outputted from a microphone based on data representing a scale being reproduced by said reproducing means;

mixing means for mixing and outputting the audio signal outputted from the microphone, the audio signal reproduced by said reproducing means and the harmony signal from said signal generating means; and speed changing means for changing a recording medium playback speed and musical interval transposing means for transposing an audio signal relating to the audio accompaniment reproduced by said reproducing means at a playback speed changed by said speed changing means.

14. A medium for karaoke use comprises a recording medium on which is recorded at least one audio signal relating to a musical accompaniment song, scale data representing an audio signal scale relating to the musical accompaniment, character data relating to the musical accompaniment and scale data for a key change position and a position after a key change.

* * * * *